April 11, 1961    F. C. LANGENBERG    2,979,396
METHOD TO CATALYZE THE REDUCTION OF ORES
Filed May 31, 1957    2 Sheets-Sheet 1
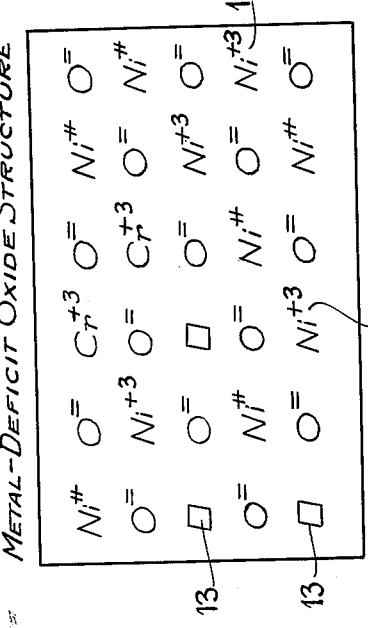
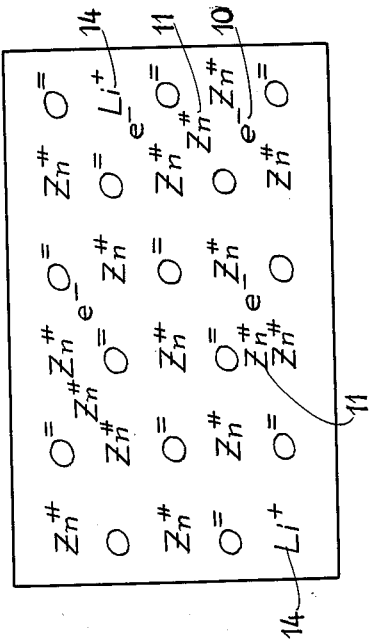
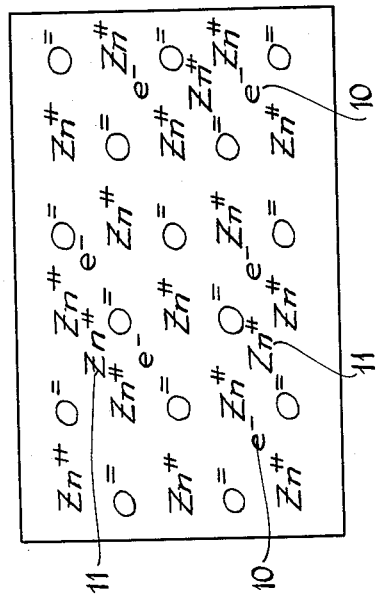
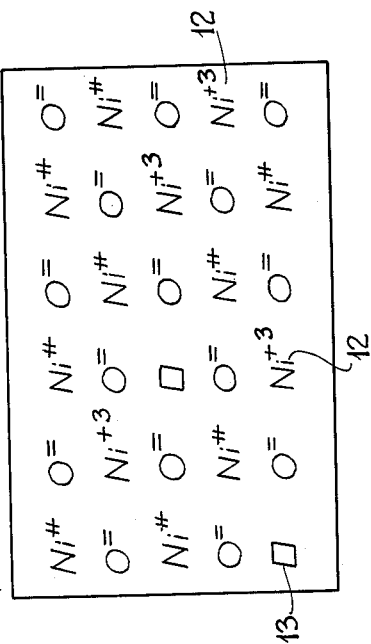
INVENTOR.
FREDERICK C. LANGENBERG.
BY
Ward, Neal, Haselton, Orme & McElhannon
ATTORNEYS.

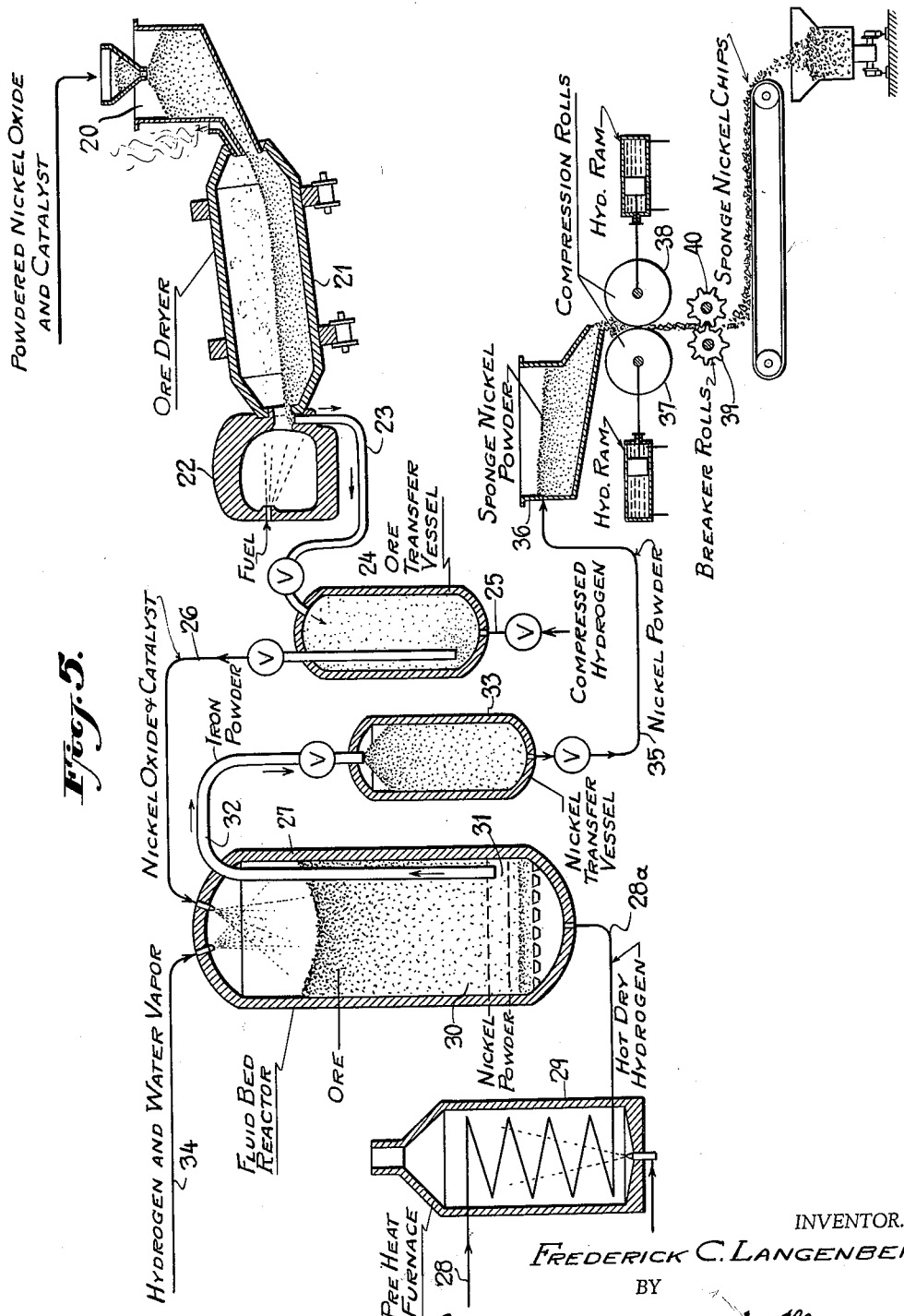

United States Patent Office 2,979,396
Patented Apr. 11, 1961

2,979,396

METHOD TO CATALYZE THE REDUCTION OF ORES

Frederick C. Langenberg, Pittsburgh, Pa., assignor to Crucible Steel Company of America, Pittsburgh, Pa., a corporation of New Jersey Filed May 31, 1957, Ser. No. 662,848

12 Claims. (Cl. 75—91)

This invention relates to methods for reducing ores, and more particularly to methods for reducing ores containing or comprising metal oxides or sulfides or both.

A few noble metals occur in nature in the pure or uncombined state, but most metals are found chemically combined with non-metallic elements, such as sulfur and oxygen. In winning the latter metals from their ores, it usually is necessary to perform a reduction operation in which the anion or non-metallic element, such as oxygen, sulfur, etc., which has a negative charge, is separated from the cation or metal constituent, which has a positive charge. In one well-known process for the reduction of metal oxides, the oxides are exposed to a hot reducing gas, and the reaction may be represented by the equation:

(1) $Me_xO_y(solid) + B(gas) = XMe(solid) + D(gas)$ wherein $Me_xO_y$ is a metal oxide, Me is the reduced metal, and $x$ and $y$ represent integral numbers. A similar equation applies to the reduction of metal sulfides by substituting sulfur, S, for oxygen, O, where occurring.

In the ore reduction process, the metal is separated from the oxygen or sulfur by virtue of the combination of the oxygen or sulfur with the reducing gas, and by virtue of the diffusion or migration of the metal atoms (see, for example, "Reduction of Ferrous Oxide," Nature, vol. 168, pp. 23 and 24, 1951, and "Mechanism of the Reduction of Oxides and Sulphides to Metals," Journal of Metals, February 1952, pp. 214–216). The rate at which the reducing gas combines with the non-metallic elements, sulfur and oxygen, can be controlled by controlling the pressure, temperature, the rate at which the reducing gas is brought to the desired ore-gas interface, the rate at which the products of reduction are moved from the interface, the composition of the local gas phase and the surface area of the solid. Prior to this invention, however, it has not been possible to control the rate of diffusion or migration in the solid. For example, it is possible to control most of the conditions which affect the ore reduction process by appropriate adjustments of the temperature, pressure and rate of flow of the reducing gas; also by selection of a highly reactive reducing gas and by initially reducing the ore to a finely comminuted or powdered state. However, when these factors are adjusted so as to provide optimum reduction conditions, the rate of reduction is nevertheless limited by the rate of metal diffusion or migration in the ore particles, because it has been found that with particles of practical size the metal ions separate from the oxide or sulfide, at least in part, by diffusion or migration through the oxide or sulfide structure. The present invention accelerates the rate of diffusion or migration of the metal through the solid, and thereby accelerates the rate of ore reduction as compared to the otherwise optimum conditions above noted.

In the process of the invention the metal compound to be reduced is admixed in finely comminuted state with a relatively small amount of a metal or metal compound or both, which forms or contains cations of different valence from the cations of the compound to be reduced. The admixture is then exposed to a hot reducing gas at a temperature sufficiently high to effect the reduction, but so controlled that it does not exceed the melting points of the metals or compounds aforesaid. During the reduction the cation of different valence provided by the added metal or compound serves as a catalyst to increase the rate of diffusion or migration through the mass of the cations of the compound to be reduced.

One object of the invention is to provide a method or process whereby the reduction of metal ores may be accomplished at a higher rate and more efficiently than has heretofore been possible.

Other objects of the invention will be apparent from the following detailed description of the manner in which I prefer to practice the invention, which description should be read in conjunction with the accompanying drawings wherein:

Figs. 1–4, inc., are schematic drawings illustrating the crystal structures of various metal oxides; both without and with the catalyst additions as explained below.

Fig. 5 is a schematic diagram illustrating a preferred form of apparatus and procedure for carrying out the method of the invention.

In accordance with one theory of the structure of metal oxides, it is considered that metal oxides are semi-conductors which embody deviations from the ideal stoichiometric compositions. These oxides are stable with either an excess of cations (positively charged ions) or an excess of anions (negatively charged ions). Usually the cations are metal ions and the anions are the non-metallic elements, oxygen ion being the anion in oxides and sulfur ion being the anion in sulfides. An oxide can have an excess of cations by having the metal ions on interstitial lattice sites or by having a deficiency of anions. Fig. 1 illustrates, in two dimensions, a model of a zinc oxide crystal which is an example of an oxide with interstitial metal ions, wherein, it will be noted, there are several interstitial electrons designated by the letter $e^-$, as at 10, such electrons being necessary for electrical neutrality, and several interstitial cations designated $Zn^{++}$, as at 11.

An oxide can have an excess of anions by having interstitial anions or by having a deficiency of cations. There are no known examples of oxides having an excess of anions, but Fig. 2 illustrates in two dimensions a model of nickel oxide, a metal or cation deficit oxide. In such an oxide electrical neutrality is maintained by the formation of cations of higher valency, designated $Ni^{+3}$, as at 12, and vacancies or defects in the crystal structure which are designated by the small squares, as at 13.

As pointed out in the above-mentioned articles, cations migrate toward a nucleus of the parent metal over distances as great as one centimeter, and the reduction mechanism involves the independent migration of ions and electrons over lattice defects or interstitial lattice sites. A defect concentration gradient is necessary for the migration. Although the details of the reduction process are not known exactly, it is believed that the following reactions occur in the reduction of an oxide in which diffusion in the lattice structure is the rate controlling factor:

(1) Reaction at the oxide-gas interface with the formation of excess cations and electrons, the filling of cation vacancies, or the removal of cations with higher than normal oxidation states.

(2) Diffusion of cations and electrons away from the gas-solid interface.

(3) Transfer of cations into the metal phase at the nucleus of the parent metal.

However, it should be understood that the above description of the suggested sequence in the reduction operation may or may not be the precise manner in which the reduction process is carried out, and it is not necessary that this sequence be the correct one in order for the invention to be operative.

As pointed out above, metal deficit oxides of the type illustrated in Fig. 2 contain cation vacancies, and in these oxides the rate of reduction is affected by the diffusion or migration of metal cations through the oxide structure. The ease with which the metal cations migrate through the oxide structure is dependent upon the number of cation vacancies, and an increase in the number of vacancies increases the rate of formation of the pure metal by increasing the rate of diffusion or migration of the metal cations in the lattice. In a pure isotropic metal oxide, the number of empty cation sites depends primarily on the temperature and little can be done with the oxide itself to increase the number of vacancies. However, I have discovered that by admixing an oxide which contains a cation of higher valency with the metal-deficit oxide to be reduced and which forms a solid solution with such latter oxide, new cation defects are created. New cation defects can also be created by adding a pure metal which has a higher valency than the cation of the oxide it is desired to reduce rather than by adding the oxide of such metal. This is because electrical neutrality must be maintained and is maintained in such a mixture of a different valency metal or its oxide because cations of the solvent oxide vacate some of their cation lattice sites. In order to produce such an effect, both the solvent oxide and the solute oxide or metal which acts as a catalyst, must be in finely divided or comminuted form in order to provide an intimate admixture of the two oxides, or the oxide and the metal, and to reduce the distances between the solvent oxide and solute oxide or solute metal to relatively small dimensions. Furthermore, the cation radius of the solute must be close to the cation radius of the solvent. The amount of catalyst or solute oxide or metal added should be a relatively small percentage of the solvent oxide and ordinarily is from about 0.001% to a maximum of 10%, preferably about 0.001 to 3%, by weight of the solvent oxide, although even a trace of the catalyst may suffice in certain instances. Of course, where the catalyst takes the form of an oxide of the catalyst cation, a larger percentage of addition is required than where the metal itself is employed as the catalyst.

Nickel oxide and wustite (ferrous oxide) are examples of metal deficit oxides and the great majority of the cations in these oxides have a valency of plus two. The admixture of chromium oxide ($Cr_2O_3$), having cations with a valency of plus three, with such oxides increases the number of cation vacancies in either nickel oxide or ferrous oxide because electrical neutrality must be maintained. The same effect is obtained if pure chromium metal is employed instead of chromium oxide. Fig. 3 illustrates the probable structure of the nickel oxide after it has been intimately admixed in finely comminuted form with a small amount of chromium oxide or of metallic chromium, also in finely comminuted form. It will be noted from a comparison of Fig. 3 with Fig. 2 that because of the admixing of nickel oxide and chromium oxide, or chromium metal, the number of cation vacancies, which are represented by squares 13 in these figures, have increased. Of course, Fig. 3 shows only a relatively small fraction of a nickel oxide particle, and therefore, the total number of cation vacancies in an entire particle would be considerably greater than that indicated in Fig. 3.

Zinc oxide (ZnO), tin dioxide ($SnO_2$), calcium oxide (CaO), barium oxide (BaO), aluminum oxide ($Al_2O_3$) and lead dioxide ($PbO_2$) are examples of metal excess oxides which contain excess cations located on interstitial lattice sites. I have discovered that the number of excess cations in these oxides may be increased by mixing such oxides in comminuted form with a metal or metal oxide which forms or contains cations whose valency is less than the valency of the cations of the oxide to be reduced. For example, lithium oxide or lithium metal will increase the number of interstitial zinc ions in the zinc oxide and the probable structure of the modified zinc oxide is illustrated in Fig. 4. It will be noted from Fig. 4 that some of the zinc ions have been replaced by lithium ions as at 14, producing a greater number of interstitial zinc ions, as at 11, and leaving fewer interstitial electrons $e^-$, as at 10, than in the unmodified oxide (compare Fig. 4 with Fig. 1). An increase in the number of interstitial metal ions has the same effect on the migration or diffusion of the metal ions as an increase in the number of lattice vacancies, and therefore, by mixing lithium oxide or lithium metal with the zinc oxide the rate of diffusion or migration, and hence the rate of reduction of zinc oxide is considerably increased.

It will be apparent from the foregoing that the cation of the metal of the catalyst has a valency different from the normal valency of the cation of the metal of the oxide which is to be reduced. Thus, with metal deficit oxides, such as nickel oxide and ferrous oxide, the great majority of the metal cations have a valency of plus two, whereas the cations of chromium oxide or chromium metal which act as a catalyst, have a valency of plus three. Also, with metal excess oxides, such as zinc oxide, the cations have a valency of plus two whereas the cations of lithium oxide or lithium metal, which act as a catalyst, have a valency of plus one.

As pointed out above, it is important that there be an intimate admixture between the solvent oxide and the catalyst and that the two materials be in finely comminuted form so as to permit an exchange of ions between the particles. Although the desired admixture may be obtained by grinding the oxides to a very fine powder, for example, one which will pass through a sieve of 20 mesh or finer, the desired association of the oxide and catalyst may also be obtained by co-precipitation from a liquid phase of compounds which contain metal cations of both metals. In a liquid solution containing the metal cations, the cations are farther apart than in the solid state, and if the metals are co-precipitated, the cations will be distributed in close association with one another throughout the oxide prepared from the precipitate.

For example, in an aqueous solution of nickel nitrate, $Ni(NO_3)_2$, and chromium nitrate, $Cr(NO_3)_3$, the principal ions are $Ni^{++}$, $Cr^{+++}$ and $(NO_3)^-$. If ammonium hydroxide is added to the solution, $Ni(OH)_2$ and $Cr(OH)_3$ are co-precipitated. By heating this precipitate, nickel oxide and chromium oxide are formed and the amount of chromium cations in the mixture is determined by the concentration of the nickel and chromium cations in the original solution.

As another example of this process, nickel carbonate, $NiCO_3$, and chromium carbonate, $Cr_2(CO_3)_3$, are both soluble in hydrochloric acid. Again, $Ni(OH)_2$ and $Cr(OH)_3$ may be co-precipitated from the solution by the addition of ammonium hydroxide, and a mixture of nickel oxide and chromium oxide is formed on heating the precipitate.

In one known process of separating oxides from the natural ores by leaching, the resulting liquor contains mixed nitrates and certain of such liquors may contain both ferric nitrate and chromic nitrate. Thus iron oxide and chromium oxide may be co-precipitated from the liquor by the proper application of heat and pressure.

It is important to note that the invention is useful principally in reduction processes in which diffusion in the oxide lattice affects the rate of reduction. Thus, in reduction processes employing relatively large ore particles, such as is required for use in blast furnaces, the rate at which the reducing gas combines with the non-metallic elements rather than the diffusion rate in the ore lattice structure, controls the reduction rate. However, when pure oxide fines of the type employed in "fluidized bed" reduction processes are used, the rate of diffusion in the lattice of the oxide markedly affects the reduction rate. Thus, with relatively fine powders there is a large surface area and there is an intimate contact between the reducing gas and the solid material. Accordingly, the method of the present invention is particularly adapted to reduce processes in which comminuted ores are used as in fluidized bed reductions.

Fig. 5 illustrates, in diagrammatic form, one type of fluidized bed apparatus which may be employed in carrying out the invention. In Fig. 5 the powdered ore and catalyst, for example, nickel oxide and chromium oxide ground to a size small enough to pass through a screen of 20 mesh or finer, are supplied to a feed hopper 20 from which the mixed oxides pass to a dryer 21. The oxides in the dryer 21 are heated and dried by means of heat supplied from a furnace 22 and after drying, are supplied by way of a line 23 to a transfer or storage vessel 24. Compressed hydrogen supplied by way of a line 25 to the vessel 24 forces the mixed oxides through a line 26 into the top of the fluid bed reactor 27. Although in the preferred form of the invention the mixed oxides are supplied to the hopper 20, it will be apparent that instead, the catalyst may be added at any other point in the system, including at the top of the fluid bed reactor 27.

Hydrogen under pressure flows through a line 28 which passes through a pre-heat furnace 29 and thus raises the temperature of the hydrogen in the line 28 so that hot dry hydrogen enters the base of the reactor 27 where it flows through the bed 30 of mixed oxides and reacts therewith. The temperature of the hydrogen supplied by the way of the line 28 preferably is in the range from 800° or 900° F. to about 1900° or 2000° F., but in any event such that the temperature within the reactor always remains substantially less than the melting points of the metals and metal compounds involved in the reduction process. The nickel oxide is reduced forming substantially pure nickel powder in a zone 31 near the base of the reactor 27 and is removed therefrom by way of line 32, which feeds to a transfer or storage vessel 33. During the reduction of the oxides in the bed 30, some of the catalyst oxides may also be reduced producing a mixture of the desired metal (e.g., nickel) and the metal of the catalyst (e.g., chromium), but such metal obtained from the catalyst oxide will form only a negligible fraction of the reducede metal in the zone 31 and will, therefore, cause no difficulties, particularly if the reduced catalyst metal is desired in the end product.

The gases resulting from the reduction process, including any water vapor, may be removed from the reactor 27 by way of the line 34. The powder in the vessel 33 (nickel powder in the example given) flows through a line 35 to a hopper 36 from which it passes between a pair of compression rollers 37 and 38 which compacts the powder into a solid mass which is subsequently broken up into chips by means of breaker rolls 39 and 40. Such chips may be used as primary melting stock in melting furnaces. Alternatively, the compacted mass formed by rolls 37, 38, may be sintered and passed through additional rolls for forming into metal strip or plate having properties comparable to that obtained by conventional melting, casting and rolling procedures.

It will be apparent from the foregoing that other types of reduction apparatus and other types of reducing gases, such as carbon monoxide, may be employed in place of the apparatus and hydrogen gas described above. Mixtures of reducing gases such as hydrogen and carbon monoxide may be employed. Although the processes of the invention have been described in connection with the reduction of metal oxides, it will be apparent that they may also be employed in connection with the reduction of other metallic compounds, e.g., sulfides.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended hereto.

What is claimed is:

1. A method of increasing the rate of reduction of a finely divided metal deficit compound of the group consisting of metal oxides and sulfides to the metal state, which comprises: forming, by method selected from the group consisting of co-precipitation and solid-solid diffusion, a solid solution of said compound and metal cations which have a higher valence than the cations of the metal deficit compound to be reduced to introduce said metal cations into the lattice structure of said compound, and exposing said solution to a reducing gas at an elevated reducing temperature below the melting point of said metals and the compounds thereof.

2. A method of increasing the rate of reduction of a finely divided metal excess compound of the group consisting of metal oxides and sulfides to the metal state, which comprises: forming, by method selected from the group consisting of co-precipitation and solid-solid diffusion, a solid solution of said compound and metal cations which have a lower valence than the cations of the metal deficit compound to be reduced to introduce said metal cations into the lattice structure of said compound, and exposing said solution to a reducing gas at an elevated reducing temperature below the melting point of said metals and the compounds thereof.

3. A method of increasing the rate of reduction of a finely divided metal deficit compound of the group consisting of metal oxides and metal sulfides to the metallic state, which comprises: intimately mixing with said compound a finely divided catalyst selected from the group consisting of metals and metal compounds the cations of which have a higher valence than the cations of the metal deficit compounds and which catalyst forms a solid solution with said compound, said catalyst being added in a quantity sufficient to increase the number of vacancies in the crystal lattice of said compound to an extent sufficient to substantially increase the rate of diffusion of cations of said compound therethrough, and exposing said mixture to a reducing gas in the temperature range of about 800–2000° F.

4. A method as set forth in claim 3 wherein the catalyst is a metal compound the anions of which are the same as those of the metal deficit compound.

5. A method of increasing the rate of reduction of a finely divided metal excess compound of the group consisting of metal oxides and metal sulfides to the metallic state which comprises: intimately mixing with said compound a finely divided catalyst selected from the group consisting of metals and metal compounds the cations of which have a lower valence than the cations of the metal excess compound and which catalyst forms a solid solution with said compound to be reduced, said catalyst being added in a quantity sufficient to increase the number of interstitial cations of said compound in the crystal lattice to an extent sufficient to substantially increase the rate of diffusion of cations of said compound therethrough, and exposing said mixture to a reducing gas in the temperature range of about 800–2000° F.

6. A method as set forth in claim 5 wherein the catalyst is a metal compound and the anions of which are the same as those of the metal excess compound.

7. The method of reducing metal compounds to the metallic state, which comprises: forming a liquid solution of two metal compounds, the cations of which have different valences, co-precipitating compounds containing said metals from said solution, treating said last-mentioned compounds to form mixed oxides of said metals in dry powder form and exposing said powder to a reducing gas at temperature below the melting point of said metals and oxides, but sufficiently high to effect said reduction.

8. The method of reducing metal compounds to the metallic state, which comprises: forming a liquid solution of compounds of two metals, the cations of which have different valences, co-precipitating hydroxides of said metals from said solution, said metal compounds being present in said solution in relative amounts such that said co-precipitate contains about 0.001 to 10% by weight of the total of one of said metal hydroxides, heating said metal hydroxides to form mixed oxides of said metals in dry powder form, and exposing said powder to a reducing gas at an elevated temperature below the melting points of said metals, but sufficiently high to effect said reduction.

9. The method of reducing nickel nitrate to the metallic state, which comprises: forming an aqueous solution of nickel nitrate and chromium nitrate, co-precipitating nickel hydroxide and chromium hydroxide from said solution by the addition of a base, said nickel and chromium nitrates being present in said solution in relative amounts such that said hydroxide co-precipitate will contain about 0.001 to 10% by weight of the total of chromium hydroxide, heating said precipitate to form a mixture of nickel and chromium oxides, and exposing said mixture to a reducing gas at an elevated temperature below the melting point of said metals and oxides, but sufficiently high to effect said reduction.

10. The method of reducing nickel carbonate to the metallic state, which comprises: dissolving nickel carbonate and chromium carbonate in hydrochloric acid, co-precipitating nickel hydroxide and chromium hydroxide from said solution by the addition of a base, said nickel and chromium carbonates being present in said solution in relative amounts such that said precipitate will contain about 0.001 to 10% by weight of the total of chromium hydroxide, heating said precipitate to form a mixture of nickel and chromium oxides, and exposing said mixture to a reducing gas at an elevated temperature below the melting point of said metals and oxides and in the temperature range of about 800 to 2000° F.

11. The method of increasing the rate of reduction of nickel oxide to the metallic state which comprises forming in a reactive vessel a bed of finely comminuted reactant material comprising nickel oxide and about 0.001 to 10% by weight of nickel oxide of a catalyst selected from the group consisting of chromium and chromium oxide, passing a reducing gas at a temperature in the range from 800 to 2000° F. through said bed to reduce said nickel oxide, and removing reduced nickel from said bed.

12. The method of increasing the rate of reduction of a ferrous oxide which comprises forming a bed in a reaction vessel of a finely comminuted reactant material comprising ferrous oxide and about 0.001 to 10% by weight of ferrous oxide of a catalyst selected from the group consisting of chromium and chromium oxide, flowing a reducing gas at an elevated temperature through said bed while maintaining the temperature of said bed below the melting points of said metals and oxides, but sufficiently high to effect said reduction, removing reduced iron from said bed and separately removing the gaseous reduction products from said vessel.

References Cited in the file of this patent

UNITED STATES PATENTS

| | | |
|---|---|---|
| 2,085,178 | Acken | June 29, 1937 |
| 2,125,909 | Gahl | Aug. 9, 1938 |
| 2,265,812 | Nagel | Dec. 9, 1941 |
| 2,296,498 | Brassert | Sept. 22, 1942 |
| 2,444,916 | Cape et al. | July 13, 1948 |
| 2,473,795 | Hills et al. | June 21, 1949 |
| 2,481,217 | Hemminger | Sept. 6, 1949 |
| 2,481,226 | Krebs | Sept. 6, 1949 |
| 2,485,945 | Wakler | Oct. 25, 1949 |
| 2,547,939 | Hayward et al. | Apr. 10, 1951 |
| 2,558,750 | Harrison | July 3, 1951 |
| 2,653,089 | Brooke | Sept. 22, 1953 |
| 2,662,009 | Roberts et al. | Dec. 8, 1953 |